C. A. CALDWELL.
STEERING GEAR.
APPLICATION FILED AUG. 24, 1920.
1,364,243. Patented Jan. 4, 1921.
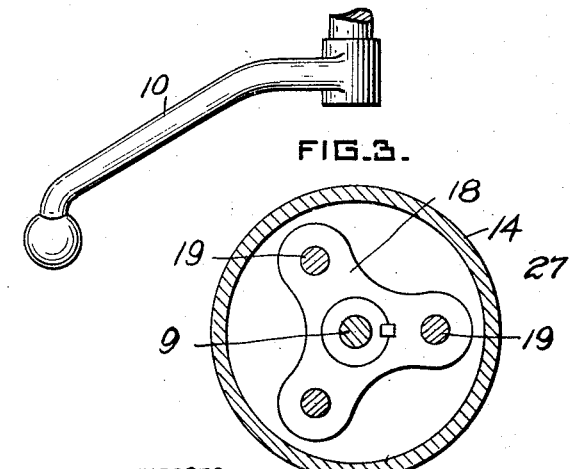
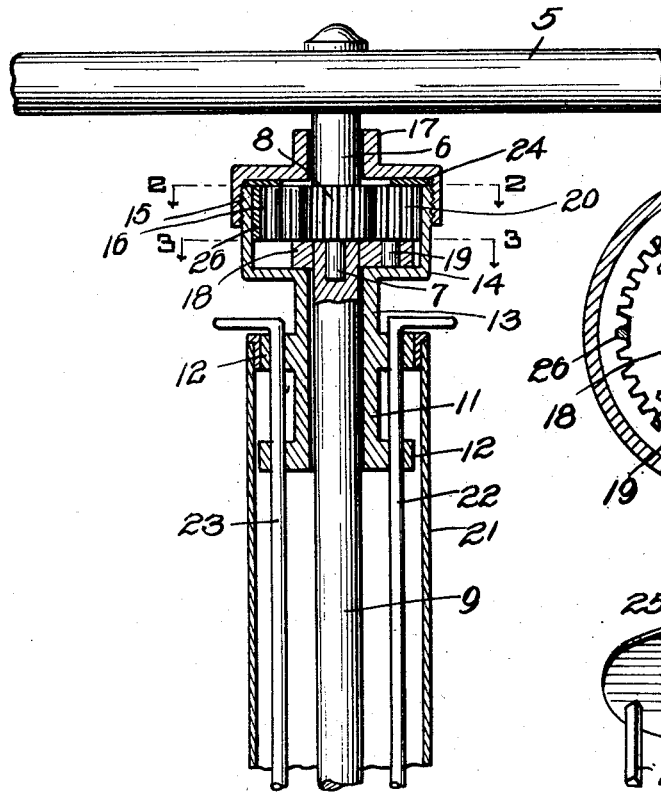
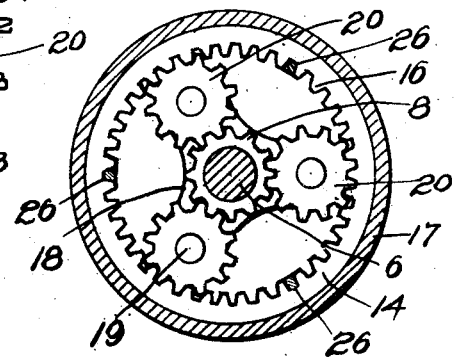
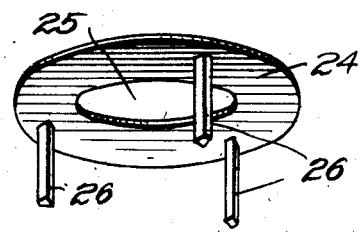
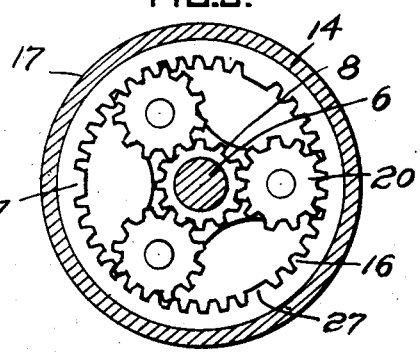

UNITED STATES PATENT OFFICE.

CLIFFORD A. CALDWELL, OF PITTSBURGH, PENNSYLVANIA.

STEERING-GEAR.

1,364,243.  Specification of Letters Patent.  Patented Jan. 4, 1921.

Application filed August 24, 1920. Serial No. 405,568.

*To all whom it may concern:*

Be it known that I, CLIFFORD A. CALDWELL, a citizen of the United States, and resident of Pittsburgh, in the county of Allegheny and State of Pennsylvania, have invented new and useful Improvements in Steering-Gears; and I do hereby declare the following to be a full, clear, and exact description thereof.

My invention relates to improvements in steering gears for vehicles, and particularly to that type of steering gear now in common use on Ford automobiles.

In my United States patent granted June 15, 1920, No. 1,343,305, I described an invention applicable to steering posts of Ford automobiles for preventing the steering wheel being turned so far as to move the connecting arm at the end of the steering post into a position where it is at a dead center. The present invention has for its object to provide means for accomplishing this same result in a more simple and equally efficient manner.

My invention is illustrated in the accompanying drawings, in which Figure 1 represents a vertical section through a portion of the steering gear of the type used on a Ford automobile, with the preferred form of my invention applied thereto. Fig. 2 is a transverse section on line 2—2 of Fig. 1. Fig. 3 is a similar section on line 3—3 of Fig. 1. Fig. 4 shows in perspective the preferred form of my invention removed from the steering mechanism. Fig. 5 represents a transverse section of a modification of my invention.

In the drawings, 5 indicates a steering wheel which is secured to a stub shaft 6, having a downwardly extending pintle 7 of less diameter than the shaft. Keyed or otherwise secured to the shaft is a pinion 8. The steering post is indicated by the numeral 9, and it is provided at its lower end with a ball arm 10. The upper end of the steering post is recessed to form a bearing for the pintle 7 of the shaft 6, as shown in the section in Fig. 1. A stationary bushing 11 provided with laterally extending legs 12 provides a bearing for the upper end of the steering post. A sleeve 13 carrying an enlarged portion of casing 14 is formed integrally with the bushing 11. The exterior of the casing 14 is threaded at 15, and on the interior of the casing is an annular rack or internal gear 16. A cap 17, which screws to the outside of the casing 14, provides a bearing for the shaft 6.

Keyed to the upper end of the steering post 9 and within the casing 14 is a spider 18 having a plurality of, preferably three, arms thereon, as shown in Fig. 3. Each arm of the spider is provided with an upright pintle 19, on each of which is rotatably mounted a gear wheel 20, which gear wheels mesh with the pinion 8 on shaft 6 and with the internal gear or rack 16, thereby forming a system of planetary gears which revolve around the pinion 8 upon the rotation thereof. This arrangement of gear wheels serves as a reduction gear in transmitting motion from the stub shaft 6 to the steering post 9.

The steering post casing is indicated at 21, and 22 and 23 are the engine control rods.

So much of the mechanism as hereinbefore described is old and is in use on Ford cars. My invention comprises means disposed in the gearing between the shaft 6 and post 9 to prevent the rod 9 from being turned more than a predetermined distance, and it preferably comprises a disk 24 having a central opening 25 and depending legs 26 which are spaced in proper relation to each other. These legs 26 are suitably shaped to fit between the teeth of the internal gear 16.

When in use, it is contemplated that the cap be unscrewed and removed, thereby removing also the steering wheel 5 and the shaft 6. When the cap 17 is removed the disk 24 is inserted in the position shown in Fig. 1, so that the legs 26 fit between the teeth of the rack 16, as illustrated in Fig. 2. Upon rotation of the hand wheel 5 in either direction, the pinion 8 will rotate gear wheels 20 until they have moved around the rack 16 and into contact with the legs 26, when further movement thereof will be prevented.

As shown in the modification in Fig. 5, the rack 16 can be formed with portions 27 where the teeth are not cut or where metal has been filled in between the teeth, so that movement of the gear wheels past a given point is prevented and the rotation of the steering post is thereby limited. Where the modified construction is employed it is not necessary to use the disk 24 with the depending legs 26.

I claim as my invention—

1. A steering gear comprising a shaft, means for rotating the shaft, a steering post, gearing including a stationary rack for transmitting rotative movement from the shaft to the post, and means in the stationary rack for limiting the rotative movement of the post.

2. A steering gear comprising a stub shaft, means for rotating the stub shaft, a pinion on said stub shaft, a steering post, gears engaging said pinion for transmitting motion from the stub shaft to the post, and means in the gearing between the shaft and the post for limiting the rotative movement of the post.

3. A steering gear comprising a stub shaft, means for rotating the stub shaft, a pinion on said stub shaft, a steering post, planetary gears revolving around said pinion and meshing therewith for turning the steering post, and means in the path of travel of said planetary gears to limit the distance through which they may revolve.

4. A steering gear comprising a stub shaft, means for turning the stub shaft, a pinion on the stub shaft, a steering post, an annular rack, a planetary gearing engaging said pinion and said annular rack for turning the steering post, and means on the rack for limiting the movement of the planetary gearing.

5. A steering gear comprising a stub shaft, means for turning the stub shaft, a pinion on the stub shaft, a steering post, an annular rack, planetary gearing engaging with said pinion and said annular rack for turning the steering post, and means inserted in said rack for limiting the movement of the planetary gearing.

6. A steering gear comprising a stub shaft, means for turning the stub shaft, a pinion on the stub shaft, a steering post, an annular rack, planetary gearing engaging the said pinion and said annular rack for turning the steering post, and means removably inserted in said rack for limiting the movement of the planetary gearing.

7. A steering gear comprising a stub shaft, a steering wheel thereon, a pinion on the stub shaft, a rotatable steering post, a spider keyed to said steering post and carrying a plurality of gear wheels which mesh with said pinion, a casing surrounding said spider and gears, an internal rack in said casing with which the gear wheels mesh, and means inserted in the rack for limiting the movement of the gear wheels.

8. A steering gear comprising a stub shaft, a steering wheel thereon, a pinion on the stub shaft, a rotatable steering post, a spider keyed to the steering post and carrying a plurality of gear wheels which mesh with said pinion, a casing surrounding the spider and gears, an internal gear tooth rack in said casing with which the gear wheels mesh, and means adapted to be inserted in said casing for contacting with the teeth of the rack for limiting the movement of the gear wheels.

9. A steering gear comprising a stub shaft, a steering wheel thereon, a pinion on the stub shaft, a rotatable steering post, a spider keyed to the steering post and carrying a plurality of gear wheels which mesh with said pinion, a casing surrounding the spider and gears, an internal gear tooth rack in said casing with which the gear wheels mesh, and means adapted to be inserted in said casing for contacting with the teeth of the rack for limiting the movement of the gear wheels, said means comprising a disk having a central opening and depending legs, said legs being adapted to engage the teeth in said rack.

10. A steering gear comprising a rotatable shaft, a steering post, an annular internal gear, a pinion on the rotatable shaft, gear wheels meshing with the pinion and the annular internal gear for rotating the steering post, and means on the annular internal gear for limiting the movement of the gear wheels.

11. An appliance for steering gears of the type used in Ford automobiles comprising a disk having a central opening and depending legs, said legs being spaced from each other.

12. A device for limiting the movement of gears of a steering post of the class described consisting of a centrally apertured holding disk or plate provided with a pin adapted to be inserted in a tooth cavity to obstruct engagement therewith of an entering tooth.

13. A device for limiting the movement of gears of a steering post of the class described consisting of a centrally apertured holding disk or plate provided with a series of properly spaced pins adapted to be inserted in corresponding tooth cavities to obstruct engagement therewith of entering teeth.

In testimony whereof, I, the said Clifford A. CALDWELL, have hereunto set my hand.

CLIFFORD A. CALDWELL.

Witnesses:
J. M. GEOGHEGAN,
LOIS WINEMAN.